March 11, 1924.
C. H. BONG ET AL
1,486,124
STORAGE BATTERY CONSTRUCTION
Filed Aug. 4, 1921
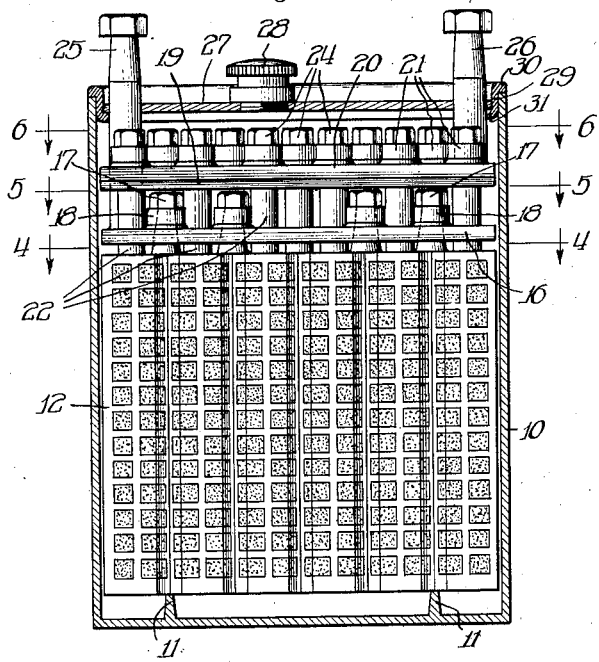
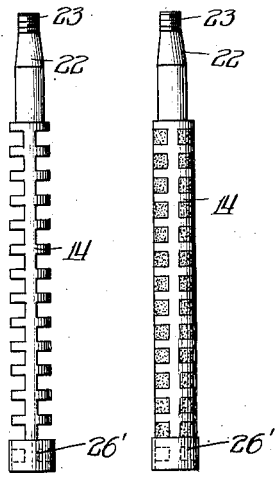
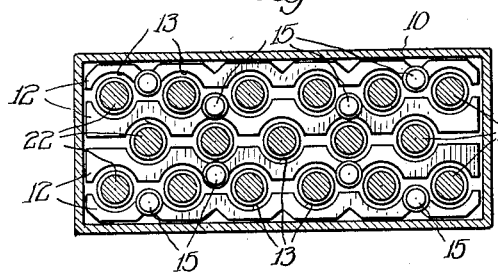
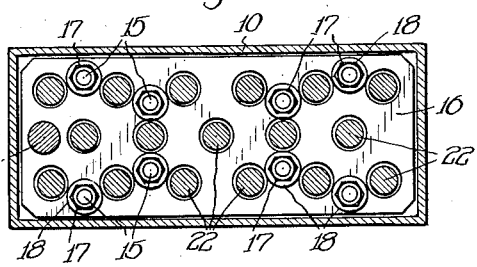
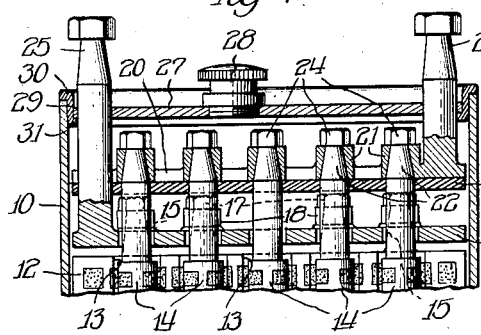
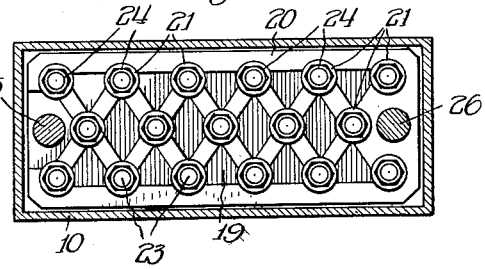
Inventors:
Clarence H. Bong and
Carl P. Sorensen,
By Wilkinson, Huxley, Byron & Knight
Attys
Witness:
R. Burkhardt.

Patented Mar. 11, 1924.

1,486,124

UNITED STATES PATENT OFFICE.

CLARENCE H. BONG AND CARL P. SORENSEN, OF CHICAGO, ILLINOIS, ASSIGNORS TO BONG BATTERY CORPORATION, OF CHICAGO, ILLINOIS, A CORPORATION OF DELAWARE.

STORAGE-BATTERY CONSTRUCTION.

Application filed August 4, 1921. Serial No. 489,924.

*To all whom it may concern:*

Be it known that we, CLARENCE H. BONG and CARL P. SORENSEN, citizens of the United States, residing at Chicago, in the county of Cook and State of Illinois, have jointly invented certain new and useful Improvements in Storage-Battery Construction, of which the following is a specification:

The present invention relates to storage battery construction.

More particularly, the present invention relates to construction of storage battery cells which may be readily assembled or disassembled.

A further object is to provide storage battery construction in which lead burning is done away with, whereby parts may be readily removed and replaced.

A further object is to provide a construction in which compounding is done away with, whereby the cover may be readily removed to permit inspection and repairs and which may be readily replaced.

Further objects will appear as the description proceeds.

Referring to the drawings—

Figure 1 is an elevational view in section of a storage battery cell;

Figure 2 is a view of one of the positive elements of the cell before the active material has been applied thereto;

Figure 3 is a view of the same element after the active material has been applied thereto;

Figures 4, 5 and 6 are sectional views taken along the lines 4, 5 and 6 respectively of Figure 1; and Figure 7 is a sectional view illustrating in detail how the various elements are mounted within the storage battery cell.

The numeral 10 indicates a jar of a storage battery cell which jar may be provided with upstanding feet 11 on the interior thereof for the purpose of supporting the elements within the cell. The negative elements are indicated by the numeral 12, and in the construction illustrated are placed in substantially parallel relation with one another, being shaped to provide between them cylindrical spaces, indicated by the numeral 13. The positive elements, which are indicated by the numeral 14, are adapted to occupy positions within said cylindrical spaces 13—13. Each of the negative elements 12 is provided with a pair of upstanding studs 15—15, which upstanding studs 15—15 are electrically connected together by means of the strap or plate 16. Each of the studs 15—15 is screw-threaded at its upper end for the reception of a nut 17. If preferred the connecting strap 16 may be provided with bosses 18 to act as abutments for the nuts 17. The negative elements 12—12 are adapted to rest upon the feet 11—11 and are held in proper spaced relation at their upper ends by reason of their connection with the connecting strap 16. They may be spaced at their lower ends by any preferred means, one means therefor being referred to hereinafter.

Resting upon the tops of the nuts 17—17 is an insulating member 19, which forms a support for a connecting strap or plate 20, which supports and electrically connects the positive elements 14. The connecting strap 20 is provided with a plurality of bosses 21—21 adapted to receive the upper tapered portions 22 of the positive elements 14. The upper ends of the positive elements 14 are screw-threaded, as indicated by the numeral 23, for the reception of nuts 24—24. The strap 16 for connecting the negative elements is provided with an upstanding terminal post 25, which will extend through suitable apertures in the insulating member 19 and connecting strap 20; and positive strap 20 is provided with an upstanding terminal post 26. Each of the positive elements 14 will extend through a suitable aperture in the insulating member 19, as indicated by Figures 5 and 6. The holes in insulating member 19 will be relatively large, compared to the size of the positive elements, and strap 20 will have an open construction, whereby to permit ventilation.

Mounted upon the lower end of each of the positive elements 14 is a cylindrical band 26' which should be impervious to the action of the electrolyte and should be an electrical non-conductor. Celluloid has been found satisfactory as a material for the band 26'. Said band serves to keep the positive elements 14—14 from swinging into electrical contact with the negative elements 12—12. Said bands 26' also serve to hold the lower ends of negative elements 12—12 in proper spaced relation.

A cell cover is indicated by the numeral 27, which cover may be provided with a removable closure 28 whereby the cell may be readily filled with water or electrolyte. The cover 27 will have a pair of apertures therein for the reception of the terminals 25 and 26. The cover is held in place by means of a caoutchouc holding member 29, which holding member 29 has a vertical wall fitting within the jar 10 and an outwardly extending flange 30 fitting over the top of the jar. The member 29 is also provided with an inwardly extending flange 31 which supports the cover 27. The member 29 will be relatively soft and the cover 27 will be made to fit relatively tightly, whereby the member 29 and cover 27 will cooperate to form a secure closure in the jar.

The engaging surfaces between separable members as, for example, between nuts 17—17 and their respective studs 15—15, between tapered portion 22—22 and bosses 21—21 and between nuts 24—24 and end portions 23—23, should be coated with an acid resisting material which will not sulphate or corrode in the presence of electric current. As examples of such material, may be cited an alloy of silver, mercury, gold or platinum.

From the foregoing description, it will be clear that the present invention provides a construction which is very sturdy, and in which the expensive and unreliable sheet separators between the positive and negative elements are eliminated. Any of the elements may be completely removed and replaced, whereby repairs may be made in a minimum of time and at a minimum of expense.

One embodiment of the present invention has been described in detail. Many modifications will occur to those skilled in the art. It is intended in this patent to cover all such modifications that fall within the scope of the invention as defined by the appended claims.

What I claim as new and desire to secure by Letters Patent in the United States, is:

1. Storage battery construction, comprising a jar having negative elements and positive elements within said jar, connecting means for electrically connecting and holding all of said negative elements together, and connecting means independent of said first mentioned connecting means for electrically connecting and releasably holding all of said positive elements together, whereby one of said sets of elements may be removed without disturbing the other set of elements, said connecting means being located within said jar.

2. Storage battery construction, comprising a jar, a plurality of negative elements, means for holding said negative elements together including removable nuts, an insulating member mounted on said holding means, an element supporting member independent of said holding means carried by said insulating member, positive elements supported by said element supporting member whereby said positive elements may be removed without disturbing said negative elements, said elements, holding means and supporting means being mounted within said jar, the engaging surfaces between the separable members being coated with an acid resisting material which will not sulphate or corrode in the presence of electric current.

3. Storage battery construction, comprising a plurality of negative elements arranged in parallel relation, each of said negative elements being provided with semi-circular indentations whereby when juxtaposed they provide between them cylindrical spaces, a supporting member mounted above said negative elements and cylindrical positive elements releasably supported by said supporting member to lie within said cylindrical spaces.

4. Storage battery construction, comprising a plurality of negative elements formed to provide between them cylindrical spaces, a supporting member mounted above said negative elements and cylindrical positive elements releasably supported by said supporting member to lie within said cylindrical spaces, said positive elements being provided with spacing bands adjacent to the lower ends thereof for stopping swinging motion of said positive elements.

5. Storage battery construction, comprising a plurality of negative elements formed to provide between them cylindrical spaces, a supporting member mounted above said negative elements and cylindrical positive elements releasably supported by said supporting member to lie within said cylindrical spaces, said elements being provided with means for preventing swinging of said positive elements into contact with said negative elements.

6. Storage battery construction, comprising a negative group having negative elements formed to provide, between them, vertical spaces, said negative group having means for releasably holding said elements in connection with one another, an insulating member mounted on said holding means, a supporting member mounted on said insulating member and positive elements releasably supported by said supporting member, extending through said insulating member and lying within the vertical spaces between said negative elements.

7. Storage battery construction, comprising a plurality of elements of one polarity formed to provide between them vertical spaces, means for releasably connecting said elements, a supporting member mounted upon said connecting means, and elements of the opposite polarity releasably supported by said supporting member to lie within said vertical spaces.

8. Storage battery construction, comprising a plurality of elements of one polarity formed to provide between them vertical spaces, a supporting member mounted above said elements of one polarity and elements of the opposite polarity releasably supported by said supporting member to lie within said vertical spaces, said last mentioned elements being provided with spacing means adjacent to the lower ends thereof for stopping swinging motion thereof.

9. Storage battery construction comprising a jar, negative elements, said negative elements providing between them vertical spaces, means for releasably connecting said negative elements together, positive elements mounted in said vertical spaces, means independent of said first mentioned connecting means for releasably connecting said positive elements together whereby one of said sets of elements may be removed without disturbing the other of said sets of elements, all of said elements and connecting means being mounted within said jar, the engaging surfaces between said elements and their connecting means being provided with acid resisting material which will not corrode in the presence of electric current.

10. Storage battery construction comprising a jar, active elements within said jar, elements of one polarity being releasably held together by means of separable connectors located within said jar, the engaging surfaces between said separable connectors being provided with acid resisting material which will not corrode in the presence of electric curent.

11. Storage battery construction including a jar, a set of positive elements and a set of negative elements mounted within said jar, separable electrical connecting means for said negative elements and separable electrical connecting means independent of said first mentioned connecting means for said positive elements whereby one of said sets of elements may be removed without disturbing the other set of elements, the engaging surfaces of the separable parts of said connecting means being covered with a material which will not sulphate or corrode in the presence of electric current, said connecting means being located within said jar.

Signed at Chicago, Illinois, this 30th day of July, 1921.

CLARENCE H. BONG.
CARL P. SORENSEN.